A. E. LEVINS.
SWINGLETREE.
APPLICATION FILED OCT. 24, 1907.
903,740.
Patented Nov. 10, 1908.
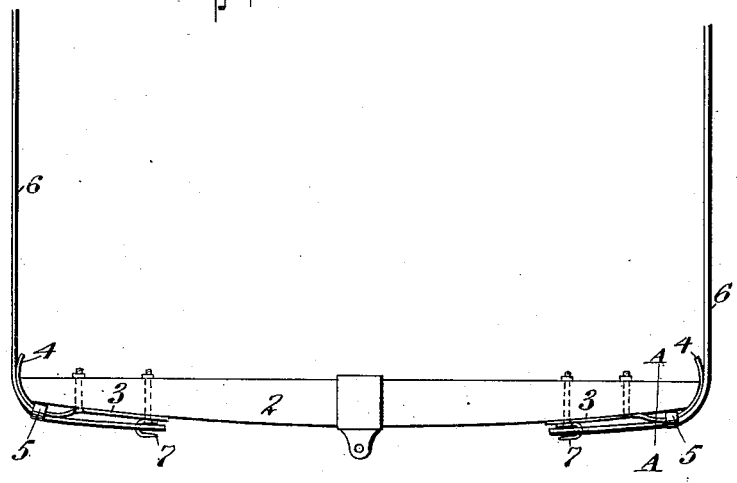
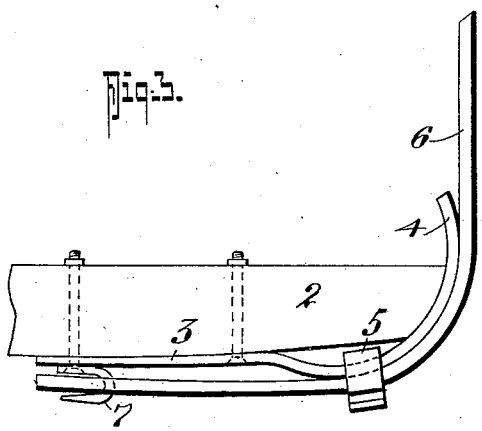
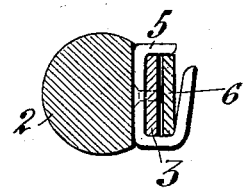
WITNESSES:
John T. Schnott
Hayward Woodard
INVENTOR
Abram E. Levins
BY
Fred G. Dieterich
ATTORNEY

UNITED STATES PATENT OFFICE.

ABRAM E. LEVINS, OF VERNON, BRITISH COLUMBIA, CANADA.

SWINGLETREE.

No. 903,740.  Specification of Letters Patent.  Patented Nov. 10, 1908.

Application filed October 24, 1907. Serial No. 399,032.

*To all whom it may concern:*

Be it known that I, ABRAM E. LEVINS, citizen of Canada, residing at Vernon, in the Province of British Columbia, Canada, have invented a new and useful Improvement in Swingletrees, of which the following is a specification.

This invention relates to a swingle-tree designed to connect a horse harness to a plow or cultivator, when such is to be used in hop-yards, orchards, or the like, where a swingle-tree of ordinary construction would be liable to injure the vines of the plants or the bark of the trees, by the ends of it projecting beyond the attachment of the harness traces, or by the trace attachments themselves.

The invention is particularly described in the following specification, reference being made to the drawings by which it is accompanied, in which:

Figure 1 is a plan of the swingle-tree showing the attachment of the traces thereto, and Fig. 2, a cross section on the line A A in Fig. 1. Fig. 3, is an enlarged view of one end of Fig. 1.

In these drawings 2 represents a straight bar swingle-tree and 6 the traces it is required to connect to it. To each end of the tree is secured a narrow metal strip 3 which is curved round the end of the bar 2 and extends as at 4 a short distance beyond the front side of it, the curvature being continued to the end of such extension. Toward the inner end of the strip 3 the hook 7 is attached to which the trace 6 is connected, which hook attachment may be utilized as a securing means for the strip, and at the commencement of the curvature of the strip 3 an open clip 5 is attached to the strip to prevent the trace 6 from getting off the end of the strip 3, while permitting it to be readily placed therein.

A swingle-tree is thus provided which is simple and cheap to manufacture and with which the cultivator or other implements may be worked as close up to plants or trees as the horse can pass, as any vines that may project will be engaged by the trace and be directed by contact with it over the end of the swingle-tree without any risk of their being caught on the projecting end or on the trace attachment.

I am aware that prior to my invention traces have been carried around the ends of swingle-trees, but where this has been done within my knowledge the swingle-tree has been a bent one approaching a semi-circle in which case the trace attachment adjacent to the end of the bar has been in such a position that it will be liable to catch plant vines or injure the bark of trees: Over such I consider my swingle-tree is a distinct improvement.

Having now particularly described my invention and the object of its use, I hereby declare that what I claim as new and desire to be protected in by Letters Patent is:

In a swingle tree, a straight bar, a metal strip secured to the backward side thereof and curved round the end, means for attaching the trace toward the inner end of the strip, means for retaining the trace on the curved bar, said last named means comprising an open hook secured to the curved bar and held between the curved bar and the straight bar said hook comprising a pair of parallel portions and a portion connecting said parallel portions and lying in a plane at right angles thereto and another portion projected from one of the parallel portions toward the other and out of parallelism with the connecting portion, substantially as shown and described.

In testimony whereof I have signed my name to this specification in the presence two subscribing witnesses.

ABRAM E. LEVINS.

Witnesses:
E. F. LLOYD,
C. J. S. SNEAKMAN.